United States Patent [19]

Rhodes et al.

[11] 4,312,234
[45] Jan. 26, 1982

[54] TWO-PHASE FLOWMETER

[75] Inventors: E. Rhodes; D. S. Scott, both of Waterloo, Canada

[73] Assignee: Alberta Oil Sands Technology and Research Authority, Edmonton, Canada

[21] Appl. No.: 149,249

[22] Filed: May 12, 1980

[51] Int. Cl.³ .............................................. G01F 1/74
[52] U.S. Cl. ................................................ 73/861.04
[58] Field of Search ............ 73/195, 198, 200, 861.04, 73/861.42, 861.52, 861.58, 861.61, 861.63, 861.65

[56] References Cited

U.S. PATENT DOCUMENTS 3,488,996 1/1970 Pfrehm .............................. 73/195 X
4,168,624 9/1979 Pichon ................................ 73/195

Primary Examiner—Jerry W. Myracle
Attorney, Agent, or Firm—E. P. Johnson

[57] ABSTRACT

The present invention provides a flowmeter for measuring pressure drops indicative of the flowrates of the individual phases in a gas and liquid containing two-phase stream. Elements are provided for creating and measuring a frictional pressure drop in the two-phase flow. Elements are also provided for creating and measuring an acceleration pressure drop in the two-phase flow. Mathematical models are known in two-phase theory for correlating these pressure drop measurements with the flowrates of the individual phases. In a preferred mode of the invention the frictional pressure drop is measured across a twisted tape; the accelerational pressure drop is measured across a venturi downstream of the twisted tape, and the pressure drops are measured by pressure transducers. The meter also preferably measures the static pressure of the two-phase flow.

12 Claims, 8 Drawing Figures

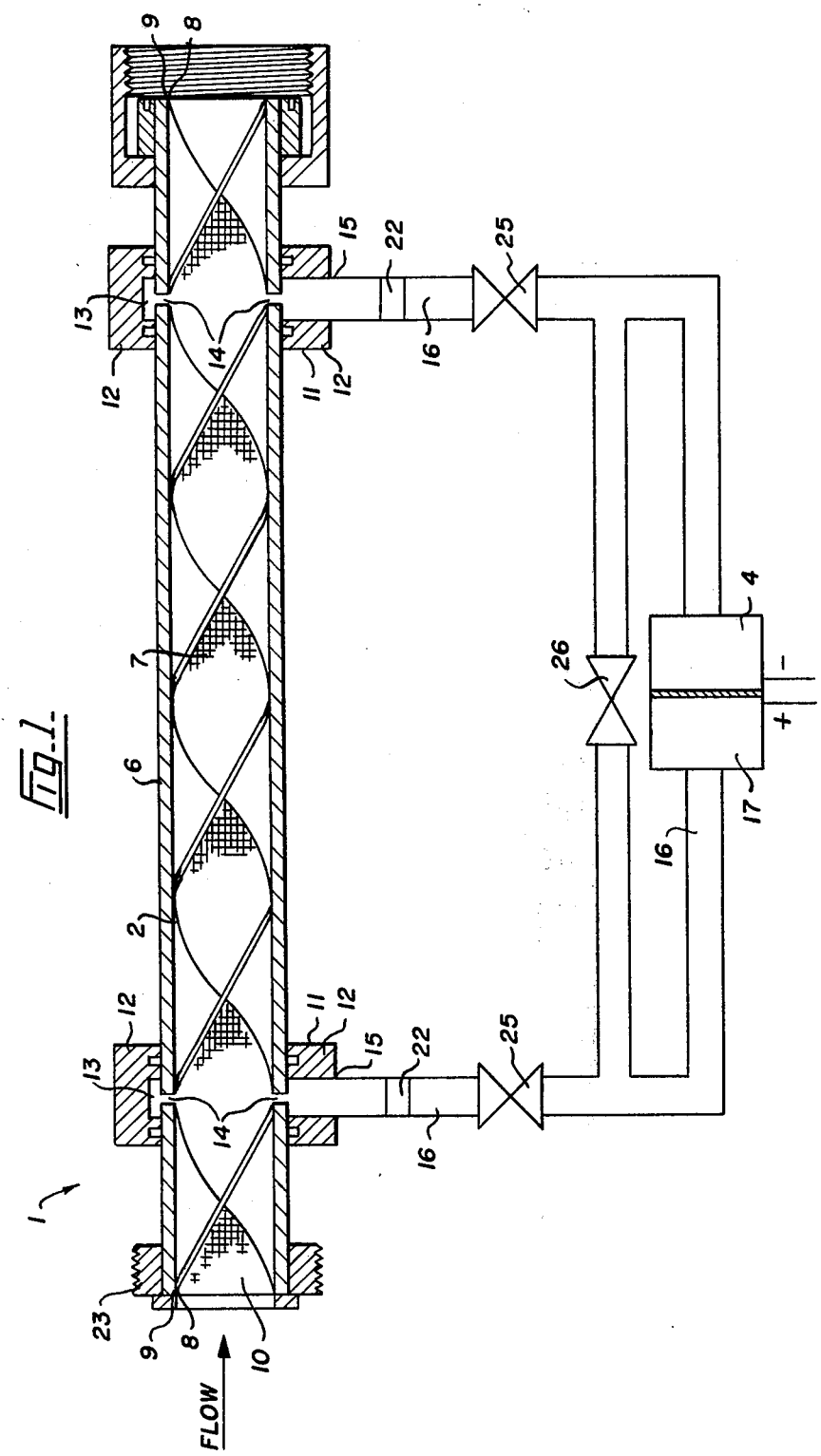

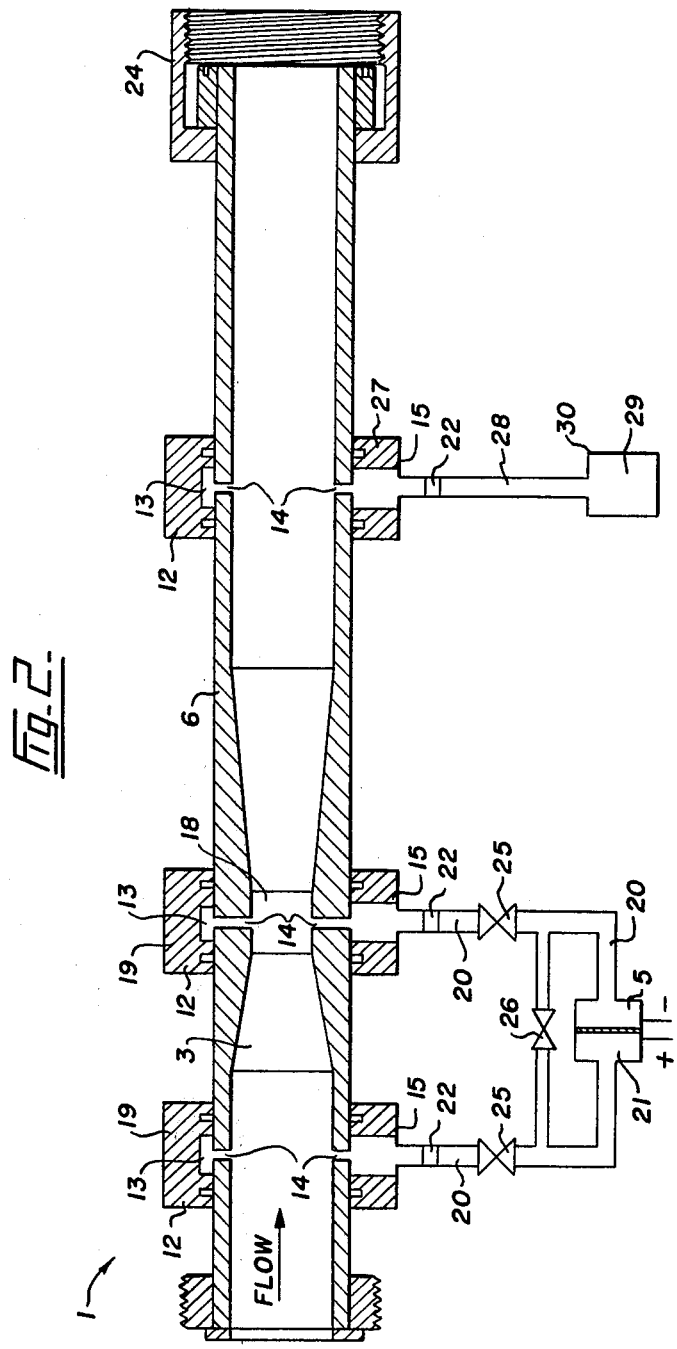

FLOW CHART FOR METERING PROGRAM

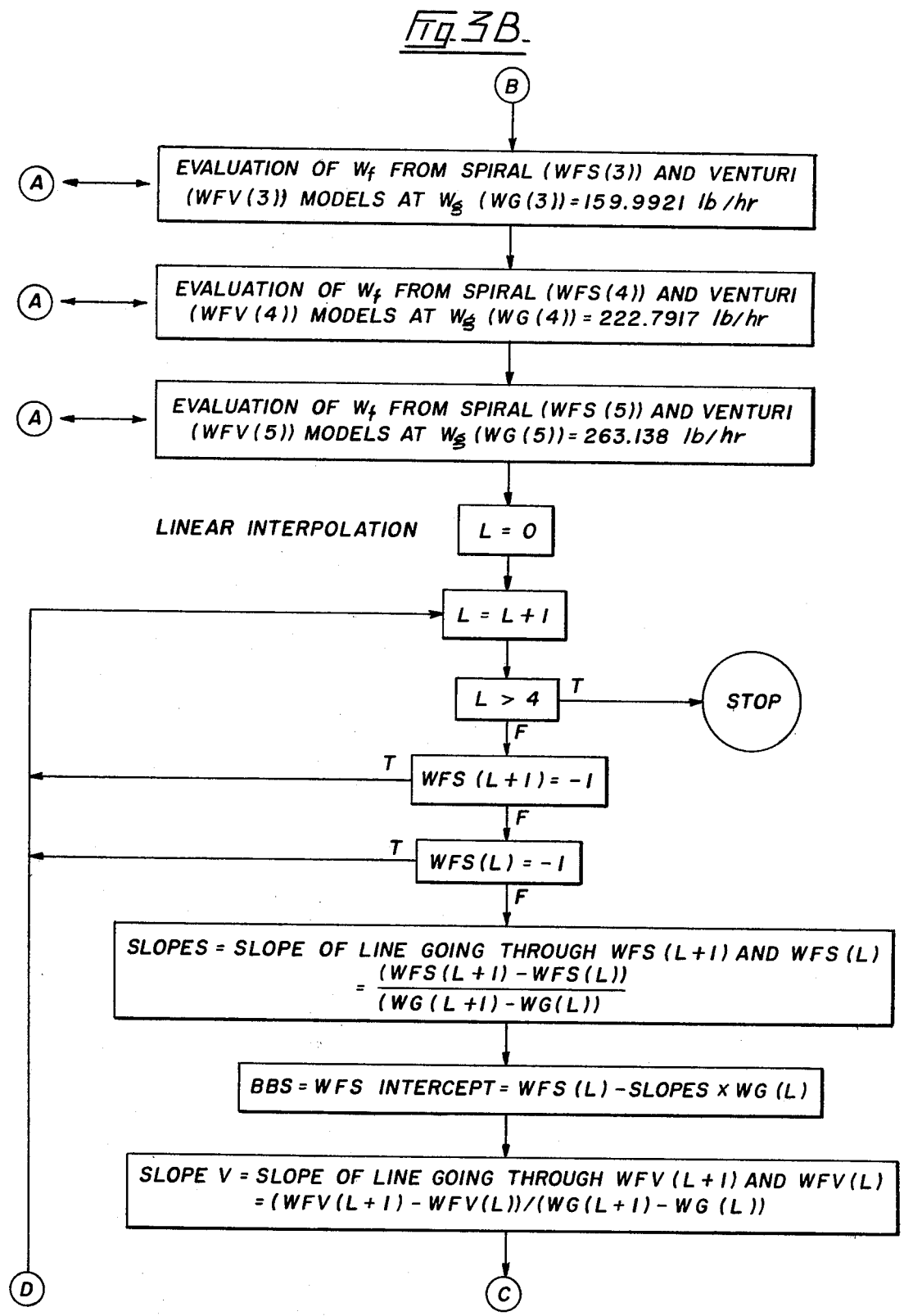

TWO-PHASE FLOWMETER

BACKGROUND OF THE INVENTION

The present invention relates to flowmeters for measuring pressure drops indicative of flowrates in a two-phase flowing stream.

By two-phase flow is meant a flowing stream containing gaseous and liquid phases of one or more components. Exemplary streams include wet steam, oil and gas, and air and water.

The flowmeters used to meter single-phase flow usually include a device for measuring a pressure drop in the flowing stream, which pressure drop can be correlated with the flow rate of the stream through theoretical mathematical models.

In two-phase flow however it is usually desirable to obtain values of the individual gas and liquid flowrates, $W_g$ and $W_f$ respectively. These flowrates are usually expressed in terms of total mass flow (W) and quality of flow (x), which terms are defined as:

$$W = W_g + W_f \text{ and}$$

$$x = W_g/(W_g + W_f)$$

A number of two-phase flowmeters are known in this art. Two such meters, which correlate one of the above flowrate parameters with a pressure differential measurement, are the Orifice Plate Meter and the Venturi Meter. The Orifice Plate Meter comprises an orifice mounted across the conduit carrying a two-phase flow. An accelerational pressure drop is measured across the orifice plate. A mathematical model is then used to correlate the stream's total mass flow with the accelerational pressure differential measured.

The Venturi Meter comprises a venturi placed in the conduit carrying the two-phase flow. An accelerational pressure drop across the venturi is measured and correlated by mathematical models either to the quality and total mass flow of the stream or to the quality and a dimensionless modified Collins parameter $F_p$, which parameter will be later explained.

Both of the above two meters rely on one pressure differential measurement to evaluate parameters of two-phase flow.

Other two-phase flow meters are known, which monitor two-phase flow with two or more measurements. One such meter employs a gamma ray densitometer to make void fraction measurements and a turbine meter or drag disc to obtain a second measurement. The two measurements are correlated mathematically to indicate the individual phase mass flowrates. This metering technique is limited to a very small quality range. It is also expensive, employing a delicate gamma ray densitometer instrument. In such two-phase streams as high pressure wet steam, such instruments would not be practical.

Very recently an Orifice-Couple Flowmeter has been proposed for two-phase flow, see K. Sekoguchi et al., "Two-Phase Flow Measurements with Orifice-Couple in Horizontal Pipe Line," Bulletin of the ISME, Vol. 21, No. 162, December, 1978. The meter includes two segmental orifices or baffles in the conduit carrying the two-phase flow. Three pressure drop measurements are taken, two across the segmental orifices and the third across two of the orifices. The two individual pressure drops and the sum pressure drop are then correlated, by a model specific to this system, to the gas and liquid flowrates. This metering system appears to give very good results. A minor disadvantage to the system is that the data is not presented in a dimensionless form. Consequently, performances for different systems are difficult to predict.

Although not used for the purpose of flow metering, twisted tape swirl generators have been used in both single and two-phase flow to enhance heat transfer in heat exchangers. In these systems a tape, having a width equal to the diameter of the conduit carrying the two-phase flow, is twisted into the conduit. The twisted tape induces a swirled flow, otherwise termed annular flow. Annular flow is a two-phase flow pattern characterized by an annular film of liquid travelling along the inner wall of the tube with the gaseous flow moving through the centre core of the tube at a much larger velocity. Users of these generators have noticed a frictional pressure drop across the twisted tape. A frictional pressure drop model for gas-liquid flow through a twisted tape has been developed, see G. S. R. Narasimhamurty et al., "Effect of Turbulence Promoters in Two-Phase Gas Liquid Flow in Horizontal Pipes," Chemical Engineering Science, Vol. 24, 1969, p. 331.

SUMMARY OF THE INVENTION

We postulated that, in order to meter two-phase flow, that is to evaluate two of the four flowrate parameters, quality, total mass flowrate, gas mass flowrate and liquid mass flowrate, one should use two independent relationships between two of these four parameters and such easily measured two-phase properties as pressure and temperature. In this way two physical aspects of two-phase flow would be used, which aspects would follow independent laws.

Theoretical two-phase models are known which may be used to correlate an accelerational pressure differential with flowrates and to correlate a frictional pressure drop with flowrates.

In accordance with the invention, we meter two-phase flow using two independent measurements. By independent measurements is meant measurements of distinct physical aspects of the two-phase flow which follow independent laws. More particularly, we utilize the combination of frictional and accelerational pressure drop measurements to meter two-phase flow.

In a preferred form of the invention, the frictional pressure drop is measured across a twisted tape in the conduit carrying the two-phase flow and the accelerational pressure drop is measured across a venturi positioned in the conduit downstream of the twisted tape. This preferred combination of measurements takes advantage of a known fact that the venturi accepts annular flow to give an excellent correlation between the pressure drop measurement and total mass flow. Thus the twisted tape, upstream of the venturi, enhances the performance of the venturi by promoting annular flow. Furthermore, the independence of the twisted tape and the venturi measurements is inherent since the former measures a "frictional" pressure drop while the latter measures an "accelerational" pressure drop.

In another preferred aspect of the invention a third parameter is measured to evaluate the physical properties of the two-phase flow. This measurement is most preferably a measurement of the temperature or the static pressure of the flow. In a two-phase one-component stream such as wet steam, either the temperature or static pressure measurement can be used as a measure of the density and viscosity of the stream. In a two-phase two-component stream, both a temperature and static pressure measurement may be needed. These physical properties are used in the mathematical models used to correlate the pressure drop measurements with the individual mass flowrates.

Broadly stated the invention comprises: a flowmeter for measuring differential pressures indicative of flowrates in a conduit carrying a gas and liquid flowing stream, comprising: first means for creating a frictional pressure drop in the conduit; means for measuring the frictional pressure drop; second means for creating an accelerational pressure drop in the conduit; and means for measuring the accelerational pressure drop.

The invention also broadly contemplates a method for measuring differential pressures indicative of flowrates in a conduit carrying a gas and liquid flowing stream. The method comprises: creating a frictional pressure drop in the conduit; measuring the frictional pressure drop; creating an accelerational pressure drop in the conduit; measuring the accelerational pressure drop; and determining by mathematical relationships the flowrates of the individual phases of the stream.

DESCRIPTION OF THE DRAWINGS

FIG. 1 shows an embodiment of the twisted tape swirl generator of the flowmeter, which generator is used to create a frictional pressure drop in a two-phase flow;

FIG. 2 shows an embodiment of the venturi of the flowmeter, which venturi is used to create an accelerational pressure drop in the two-phase flow;

FIGS. 3A-3D set forth a computer program used to correlate the pressure drop measurements across the twisted tape and venturi with the individual flowrates of the two phases;

DESCRIPTION OF THE PREFERRED EMBODIMENT

Figure 3A:
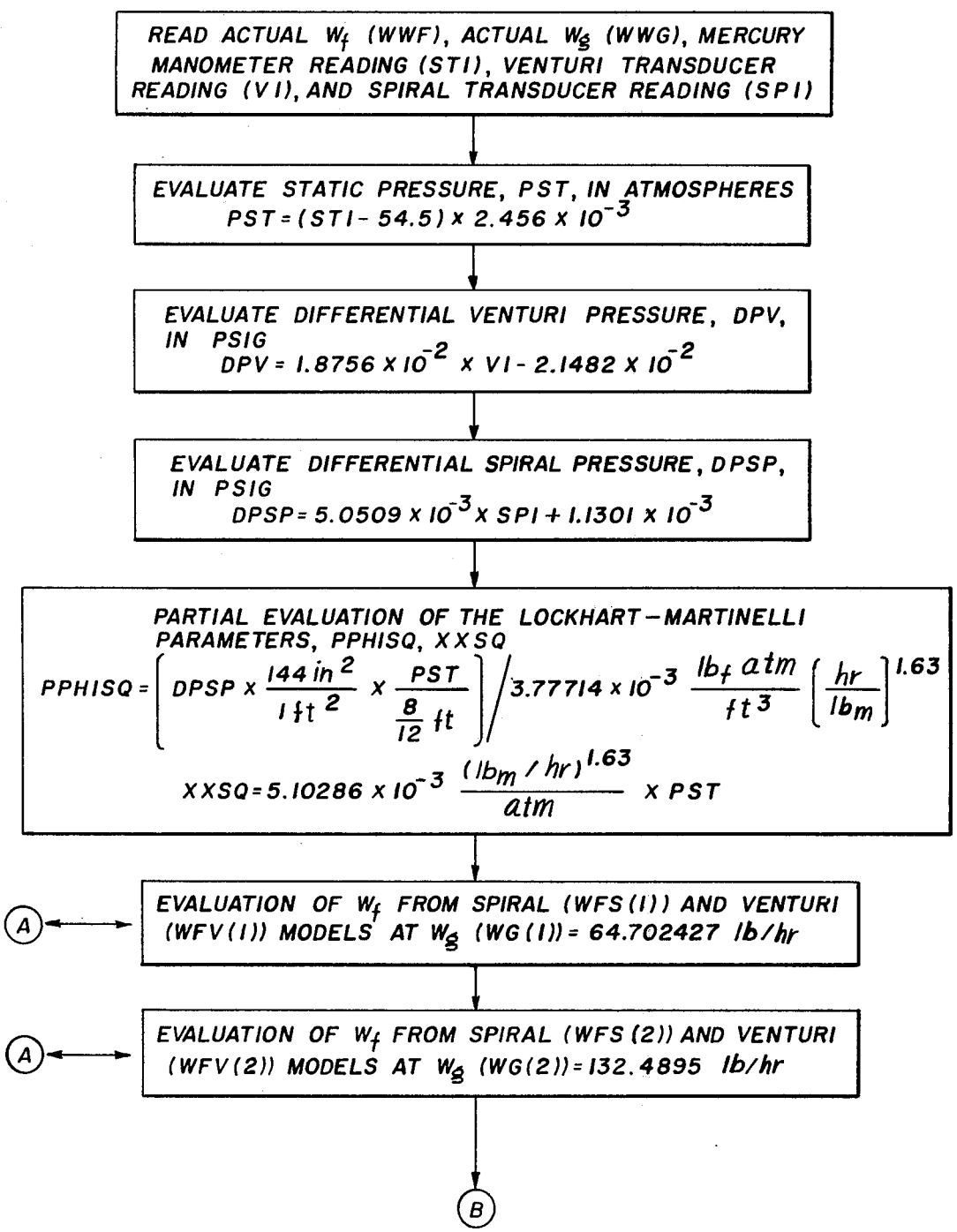

The flowmeter 1 of the present invention is functional to create and measure pressure drops in the two-phase flow stream, which pressure drops can be correlated to the individual flowrates of the two phases.

The flowmeter 1 is shown in its preferred embodiment in FIGS. 1 and 2. The flowmeter 1 includes a twisted tape swirl generator 2 and a venturi 3 mounted in a horizontal conduit 6 carrying a two-phase flow stream. Pressure transducer means 4 and 5 respectively are provided to measure the pressure differential across the twisted tape 2 and the venturi 3.

The twisted tape swirl generator 2 provides a means for creating a frictional pressure drop in the horizontal conduit 6. Alternatively a linear length of tubing could be used to create a frictional pressure drop, however this would necessitate a long length of tubing. Twisted tape swirl generators are known in the prior art, see for example E. Smithberg et al., "Friction and Forced Convection Heat-Transfer Characteristics in Tubes with Twisted Tape Swirl Generators," Journal of Heat Transfer, February, 1964, p. 39, and G. S. R. Narasimhamurty et al., "Effect of Turbulence Promoters in Two-Phase Gas Liquid Flow in Horizontal Pipes," Chemical Engineering Science, Vol. 24, 1969, p. 331. Briefly, the twisted tape 2 includes a length of steel tape 7 having a width equal to the diameter of the conduit 6. The tape 7 is twisted into the conduit 6 to a desired pitch and the ends 8 secured into notches 9 in the conduit 6. Preferably the upstream edge 10 of the tape is aligned vertically to split the entering liquid phase evenly.

To measure the frictional pressure drop across the twisted tape 2, two pressure taps 11 are provided leading into the conduit 6, preferably at points spaced slightly inwardly from the ends 8 of the tape 7. This spacing allows the annular flow pattern, known to be created in the twisted tape 2, to develop and also avoids the possible entrance and exit pressure losses. Each pressure tap 11 consists of a piezometric ring 12 sealed around the conduit 6 enclosing an annulus 13 between the ring 12 and the conduit 6. A plurality of holes 14 through the walls of the conduit 6 open into the annulus 13. Through a connecting hole 15 in the piezometric ring 12, is connected a pressure line 16 leading to one side of a diaphragm magnetic-reluctance transducer 17. The transducer 17 is well known in the art and functions to convert a pressure differential into an electric signal.

The venturi 3 is shown in detail in FIG. 2. The venturi 3 provides a means for creating an accelerational pressure drop in the conduit 6. Alternatively, a nozzle, orifice, segmental baffle or other device, known to create an accelerational pressure drop in two-phase flow, can be substituted for the venturi. The venturi 3 however is preferred, since it is known to accept the annular two-phase flow from the twisted tape 2 and also to give a good correlation between the accelerational pressure drop measured across the venturi and the total mass flowrate (W). The venturi 3 is placed downstream of the twisted tape 2 for the above reason. A venturi is well known in the prior art and includes a constricted throat section 18 in which the velocity of the two-phase flow increases while the pressure across the throat 18 decreases.

To measure the accelerational pressure drop across the venturi 3, two pressure taps 19 are provided leading into the venturi. As shown in FIG. 2, the taps 19 are spaced inwardly from the ends of the venturi 3. The pressure taps 19 are identical to the pressure taps 11 previously disclosed and like reference numerals have been used to indicate like parts. A pressure line 20 interconnects the pressure taps 19 to opposite sides of a diaphragm magnetic-reluctance transducer 21.

Since pressure fluctuations in two-phase flow metering are usually high, pressure snubbers 22 are preferably included in the pressure lines 16, 20 between each of the pressure taps 11, 19 and the transducers 17, 21. These pressure snubbers 22 are widely used in two-phase flow metering to dampen the pressure fluctuations. The snubbers 22 comprise a moveable weighted piston (not shown) inserted in a thin capillary tube (not shown). To further limit pressure fluctions, the pressure lines 16, 20 are periodically purged with either a gas or liquid. The gas or liquid filling the lines 16 and 20 acts as a means for transmitting the pressure from the pressure taps 11, 19 to the transducers 17, 20. This purging technique is standard in two-phase flow metering.

To protect the electronic transducers 17, 21, isolation valves 25 are included in the pressure lines 16, 20 on each side of the transducers 17, 21. Equalization valves 26 are also included to further protect the transducers.

Opposite ends 23, 24 of the conduit 6 are threaded to connect the flowmeter 1 with the pipeline (not shown) carrying the two-phase flow. Preferably the diameter of the conduit 6 is the same as the diameter of the pipeline so as not to further interrupt the two-phase flow.

In most two-phase flow metering situations, it is desirable to measure a third parameter, such as the static pressure of the stream. As will become evident from the description to follow, this third parameter is usually needed in order to correlate the above two pressure drop measurements with the individual flowrates of the two phases. This correlation includes physical properties such as the density and viscosity of each of the two phases. In a one-component two-phase stream such as wet steam, a measurement of either the static pressure or the temperature of the stream, allows one to calculate the density and viscosity of each phase. With wet stream for instance, standard steam tables may be used. In a two-component two-phase stream both a temperature and static pressure measurement may be needed. If however, the flowmeter 1 is to be used in a two-phase flow stream having known physical properties, the third parameter would not be needed.

In general, the third parameter can be measured anywhere in proximity to the twisted tape 2 and venturi 3. In FIG. 2, means 30 are shown for measuring the static pressure of the two-phase flow downstream of the venturi. The means 30, includes a pressure tap 27, identical to the pressure tap 11, is provided in the conduit 6. A pressure line 28 leading from the tap 27 is connected to a pressure sensing device 29, such as an open ended mercury manometer or an electronic pressure transducer. If it is desirable to measure the temperature of the stream, a suitable temperature sensing device (not shown) may be provided in the flowmeter.

The following example is included to demonstrate the operability of the preferred embodiment of the flowmeter, and to show the type of calculations involved in correlating the flowmeter measurements with the individual flowrates of the two phases.

EXAMPLE

A flowmeter as shown in FIGS. 1 and 2 was constructed and inserted into a 1" diameter pipeline carrying an air-water two-phase flow stream. The twisted tape swirl generator consisted of a 1/16"×1"×12" length of stainless steel tape twisted in an anticlockwise direction (as viewed from the upstream end of the flowmeter) to a pitch of 4 inches. The venturi consisted of a 3¾" length venturi section having an entrance and exit diameter of 1" and a throat diameter of ⅝". The static pressure of the two phase flow was measured downstream of the venturi with an open ended mercury manometer.

The D.C. signals from the transducers 17 and 21 were routed to a digital readout, chart recorder and minicomputer (not shown). The differential pressure signals recorded on the chart recorder were time averaged over 2-3 minutes.

To initially calibrate the flowmeter, the air-water stream was injected through the flowmeter at known air and water flowrates, $W_g$ and $W_f$ respectively, in a quality (x) range of 0.25 to 0.90.

Ultimately, the measurements from the venturi, twisted tape and static pressure sensor are to be combined to define any two of the parameters total mass flowrate (W), liquid mass flowrate ($W_f$), gas mass flowrate ($W_g$) and quality (x). Of course volumetric flowrates can also be calculated.

Theoretical models are known to correlate these pressure drop measurements with the above parameters. In this example the twisted tape results were modelled by the Lockart-Martinelli parameters $\overline{X}^2$ and $\overline{\phi}^2$ in their following form:

$$\overline{X}^2 = \left[\frac{Re_{gt}}{Re_{ft}}\right]^n \left[\frac{\rho_g}{\rho_f}\right] \left[\frac{W_f}{W_g}\right]^2 \quad (1)$$

where
$Re_{gt}$ and $Re_{ft}$ are Reynold's numbers for the gas and liquid phases respectively;
$\rho_g$ and $\rho_f$ are the densities of gas and liquid phases respectively;

$$\overline{\phi}^2 = \frac{(\Delta P/\Delta L)_{tpt} D_H g_c \rho_g A^2}{2fW_g^2} \quad (2)$$

where
$(\Delta P/\Delta L)_{tpt}$ is the pressure drop across the twisted tape
$D_H$ is the hydraulic diameter of the conduit;
$g_c$ is a conversion factor = 32.17 lb. ft/lb$_f$s$^2$;
A is the cross sectional area of the conduit; and
f is Fannings friction factor.

The results from the venturi were modelled by the following modified Collins parameter $F_p$ and quality (x):

$$F_p = D^2 \left[\frac{g_c \rho_g \Delta P_{tpv}}{W^2}\right]^{\frac{1}{2}} \quad (3)$$

where
D is the inside conduit diameter;
$\Delta P_{tpv}$ is the pressure drop across the venturi; and $$x = \frac{W_g}{W_g + W_f} . \quad (4)$$

The flowmeter was first calibrated with known flowrates $W_f$ and $W_g$. The pressure transducers 17 and 21 were calibrated by known techniques using a column of water. The results for the transducer calibrations were modelled by the following linear least squares equations:

$(\Delta P/\Delta L)_{tpt} = 5.0509 \times 10^{-3} \times \text{(transducer reading)} + 1.1301 \times 10^{-3};$ (5)

and $\Delta P_{tpv} = 1.8756 \times 10^{-2} \times \text{(transducer reading)} - 2.1482 \times 10^{-2}.$ (6)

From the measurements of $\Delta P_{tpv}$, $(\Delta P/\Delta L)_{tpt}$ and the static pressure $P_s$ at a number of known flowrates $W_f$, $W_g$, a number of values of $F_p$, n, $\overline{\phi}^2$ and $\overline{X}^2$ were calculated. The values for $Re_{gt}$, $Re_{ft}$ $\rho_g$, and $\rho_f$ were calculated from the values of $P_s$, the static pressure value. Using these results the venturi results were modelled by the linear relationship:

$x = m F_p + b,$ (7)

and the twisted tape results were modelled by the relationship:

$$\overline{\phi}_g^2 = B_1 + B_2\overline{X} + B_3\overline{X}^2. \tag{8}$$

The parameters m, b, $B_1$, $B_2$ and $B_3$ were derived from a least squares analysis for a number of gas mass flowrate, $W_g$, values. For clarification purposes these values for $W_g$, $B_1$, $B_2$ and $B_3$, m and b are reproduced in Table 1.

TABLE 1

LEAST SQUARES PARAMETERS FOR THE TWISTED TAPE AND VENTURI MODELS

Twisted Tape Model: $\overline{\phi}_g^2 = B_1 + B_2\overline{X} + B_3\overline{X}^2$.

Venturi Model: $x = mF_p + b$

| $W_g$(lb/hr) | $B_1$ | $B_2$ | $B_3$ | m | b |
|---|---|---|---|---|---|
| 64.702427 | 1.75059 | 16.565439 | 3.471168 | 0.649527 | −0.154006 |
| 132.4895 | 0.8729569 | 35.193932 | −45.160512 | 0.560633 | −0.151019 |
| 159.9971 | 1.108096 | 38.224306 | −55.09309 | 0.537628 | −0.162189 |
| 222.7917 | 1.16932 | 40.792134 | −43.551016 | 0.554722 | −0.205751 |
| 263.138 | 1.485076 | 39.851965 | −24.578145 | 0.51217 | −0.178217 |

Figure 3C:
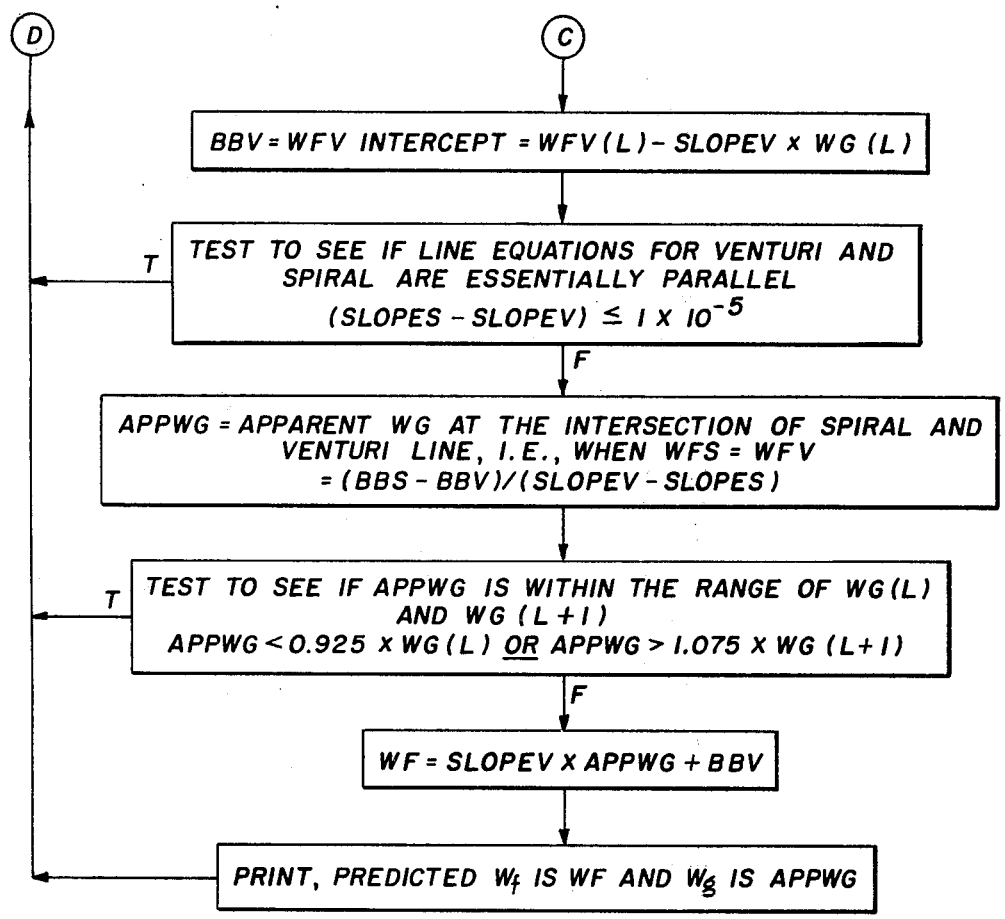
Figure 3D:
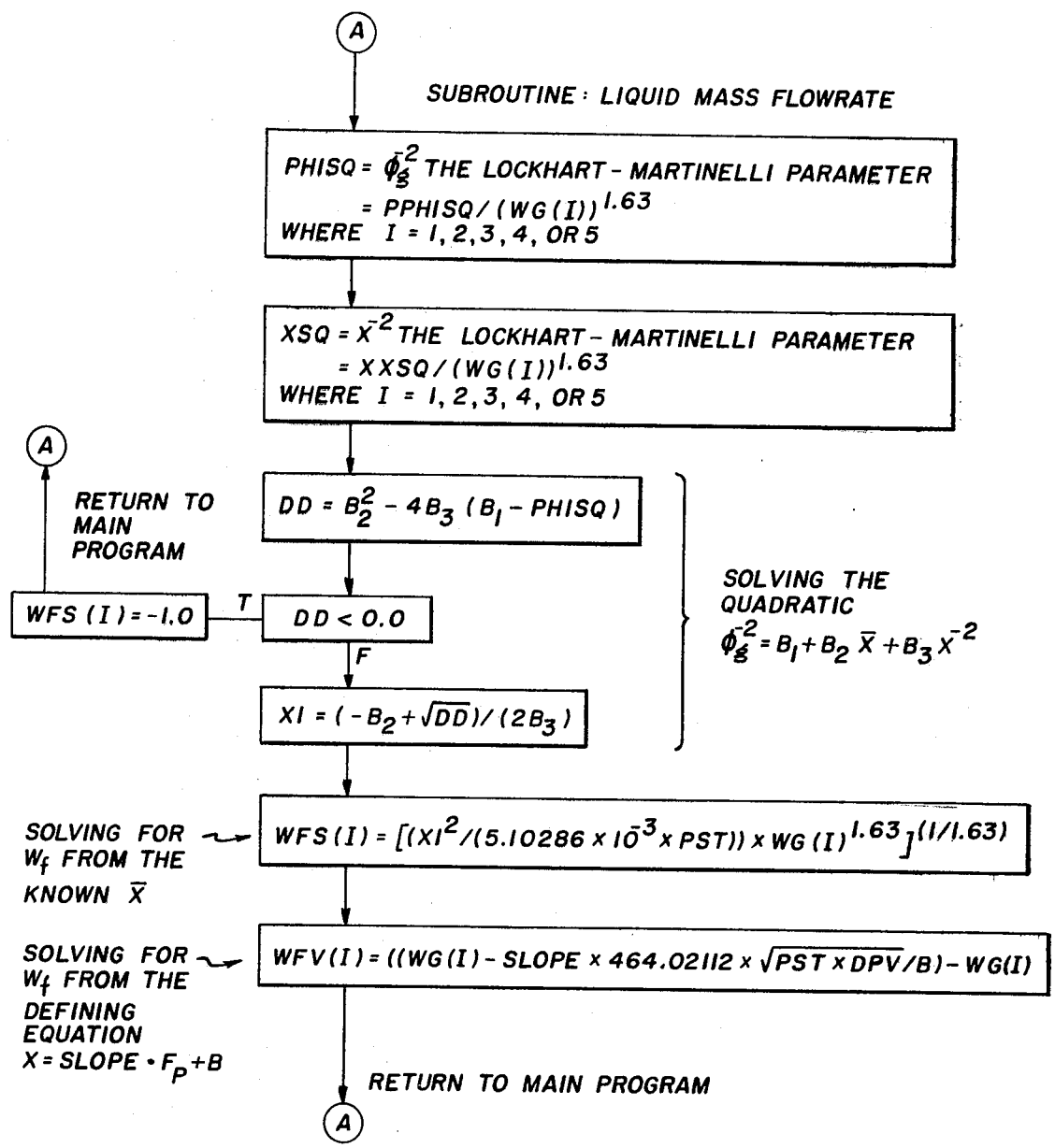

A computer program was constructed to utilize these relationships (7) and (8) in a linear interpolation technique to evaluate values for the gas and liquid flowrates, $W_g$ and $W_f$, for a given set of pressure readings $P_s$, $(\Delta P/\Delta L)_{tpt}$ and $\Delta P_{tpv}$. The computer program utilized is reproduced in FIG. 3. By exploiting the $W_g$ level dependency shown in Table 1, values for $W_f$ were evaluated for each of equations (7) and (8). Subsequently, two sets of $W_f$ and $W_g$ values were generated from the venturi and twisted tape equations (7) and (8). The trend of $W_f$ with respect to $W_g$ for each set of values was quite different. Thus the intersection of both sets of data was used to represent the simultaneous solution of the venturi and twisted tape equations (7) and (8). This intersection was evaluated by applying a linear interpolation for each set of data points.

Figure 4:
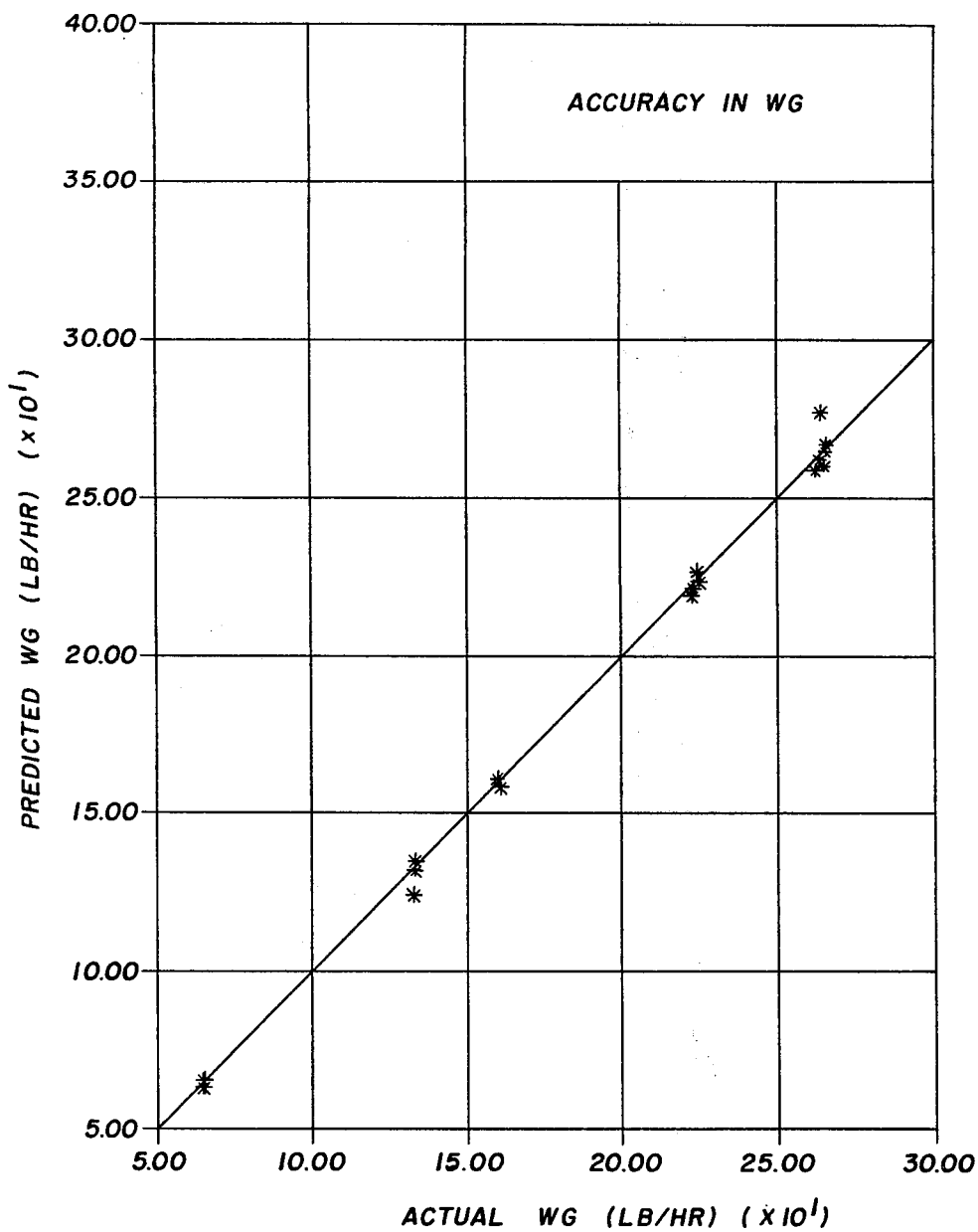
FIG. 4 is a plot to illustrate the accuracy of the flowmeter and the correlating algorithm of FIG. 3 for the gas flowrate $W_g$; the actual gas flowrate is plotted against the gas flowrate obtained by correlating the pressure drop measurement from the flowmeter with the gas flowrate.
Figure 5:
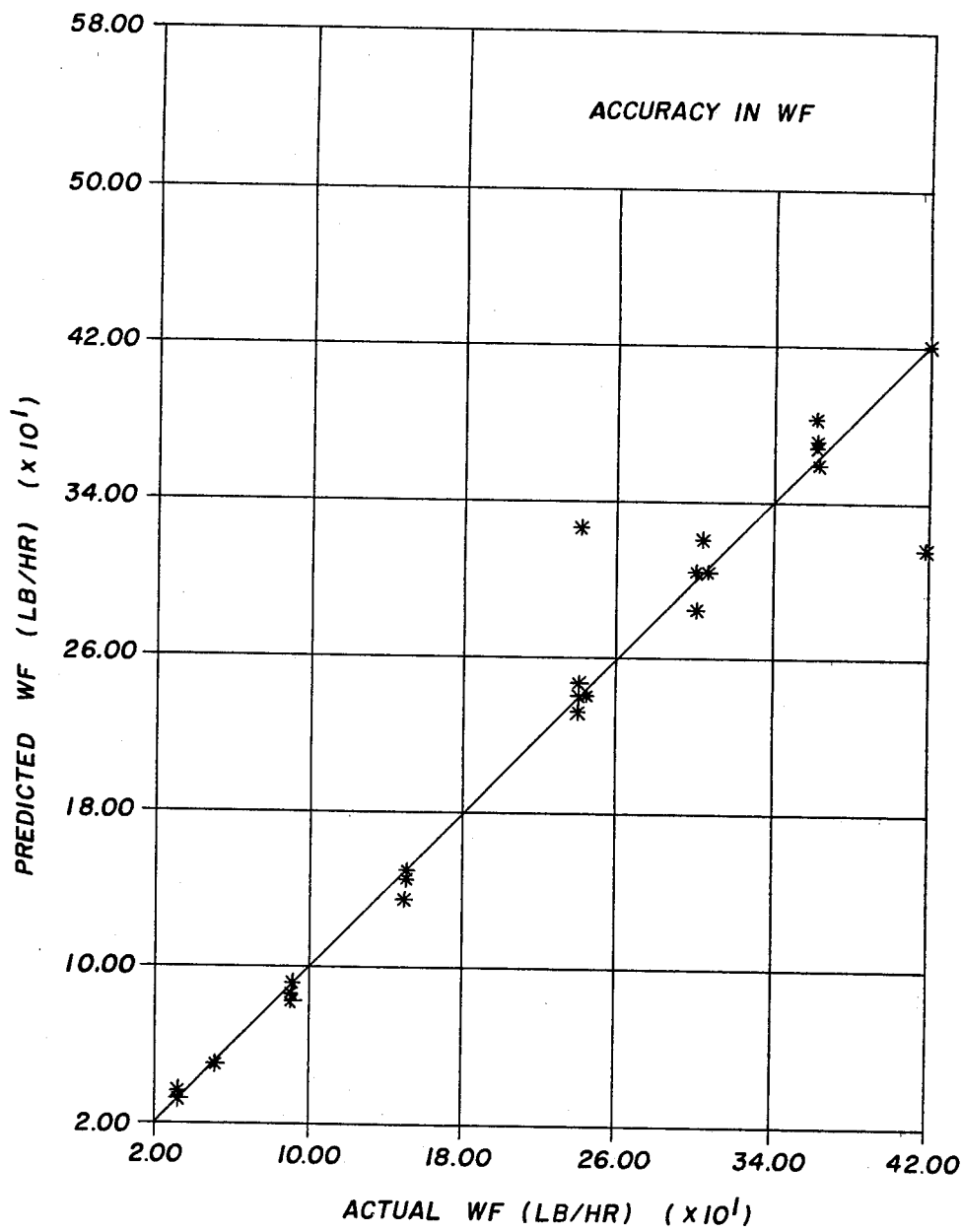
FIG. 5 is a plot similar to FIG. 4, showing the accuracy of the flowmeter and correlating algorithm for the liquid mass flowrate $W_f$.

The efficiency of this technique of metering and correlating is illustrated in FIGS. 4 and 5 in which the $W_f$ and $W_g$ predicted values are plotted against the $W_f$ and $W_g$ actual values. Accuracy was generally within about 3% for $W_g$ and 6% for $W_f$. The accuracy of these predictions could be improved if more experimental data were used to decrease the size of the interval which required linear interpolation. Extrapolation beyond the original range used in calibrating the instrument is not advised.

While the present invention has been disclosed in connection with the preferred embodiment thereof, it should be understood that there may be other embodiments which fall within the spirit and scope of the invention as defined by the following claims.

The embodiments of the invention in which an exclusive property or privilege is claimed are defined as follows:

1. A flowmeter for measuring differential pressures indicative of flowrates in a conduit carrying a gas and liquid flowing stream, comprising:
   first means for creating a frictional pressure drop in the conduit;
   means for measuring the frictional pressure drop;
   second means for creating an accelerational pressure drop in the conduit; and
   means for measuring the accelerational pressure drop.

2. The flowmeter as set forth in claim 1 wherein:
   the second means is located downstream of the first means.

3. The flowmeter as set forth in claim 2 wherein:
   said first means is a longitudinally twisted tape positioned in the conduit and adapted to cause swirled flow in the stream.

4. The flowmeter as set forth in claim 3 wherein:
   said second means is a venturi positioned in the conduit.

5. The flowmeter as set forth in claim 4 wherein:
   the means for measuring the frictional pressure drop comprises pressure transducer means connected across at least a portion of the twisted tape; and
   the means for measuring the accelerational pressure drop comprises pressure transducer means connected across at least a portion of the venturi.

6. The flowmeter as set forth in claim 1 or 4 which further comprises:
   third means for measuring the static pressure in the conduit.

7. The flowmeter as set forth in claim 6 wherein:
   said third means comprises manometer means connected to the conduit.

8. A method for measuring differential pressures indicative of flowrates in a conduit carrying a gas and liquid flowing stream, comprising:
   creating a frictional pressure drop in the conduit;
   measuring the frictional pressure drop;
   creating an accelerational pressure drop in the conduit;
   measuring the accelerational pressure drop; and
   determining by mathematical relationships the flowrates of the individual phases of the stream.

9. The method as set forth in claim 8 wherein:
   the frictional pressure drop is created by passing the stream through a longitudinally twisted tape positioned in the conduit; and
   the accelerational pressure drop is created by passing the stream through a venturi positioned in the conduit downstream of the twisted tape.

10. The method as set forth in claim 8 or 9, which further comprises:
    measuring the static pressure in the conduit.

11. The method as set forth in claim 10 wherein:
    the gas mass flowrate $W_g$ and the liquid mass flowrate $W_f$ are determined by correlating the frictional pressure drop measurement $(\Delta P/\Delta L)_{tpt}$, the accelerational pressure drop measurement $\Delta P_{tpv}$ and the static pressure measurement $P_s$ with $W_f$ and $W_g$ through the mathematical relationships:

$$\overline{X}^2 = \left[\frac{Re_{gt}}{Re_{ft}}\right]^n \left[\frac{\rho_g}{\rho_f}\right] \left[\frac{W_f}{W_g}\right]^2$$

wherein $Re_{gt}$ and $Re_{ft}$ are Reynold's numbers for the gas and liquid phases respectively as determined from the static pressure $P_s$, and $\rho_g$ and $\rho_f$ are the densities of the gas and liquid phases respectively as determined from the static pressure $P_s$;

$$\overline{\phi}^2 = \frac{(\Delta P/\Delta L)_{tpt} D_H g_c \rho_g A^2}{2fW_g^2}$$

wherein $D_H$ is the hydraulic diameter of the conduit; $g_c$ is a conversion factor equal to 32.17 lb.

ft./lb.$_f$s$^2$, A is the cross-sectional area of the conduit and f is Fanning's friction factor;

$$F_p = D^2 \left[ \frac{g_c \rho_g \Delta P_{tpv}}{W^2} \right]^{\frac{1}{2}}$$

wherein D is the inside conduit diameter; and $x = W_g/(W_g + W_f)$.

12. The method as set forth in claim 8 or 9 wherein: the gas mass flowrate $W_g$ and the liquid mass flowrate $W_f$ are determined by correlating the frictional pressure drop measurement $(\Delta P/\Delta L)_{tpt}$ and the accelerational pressure drop measurement $\Delta P_{tpt}$ with $W_g$ and $W_f$ through the mathematical relationships $$\overline{X}^2 = \left[ \frac{Re_{gt}}{Re_{ft}} \right]^2 \left[ \frac{\rho_g}{\rho_f} \right] \left[ \frac{W_f}{W_g} \right]^2$$

wherein $Re_{gt}$ and $Re_{ft}$ are Reynold's numbers for the gas and liquid phases respectively, $\rho_g$ and $\rho_f$ are the densities of the gas and liquid phases respectively, $Re_{gt}$, $Re_{ft}$, $\rho_g$ and $\rho_f$ being assumed to be known for the stream;

$$\overline{\phi}^2 = \frac{(\Delta P/\Delta L)_{tpt} D_H g_c \rho_g A^2}{2 f W_g^2}$$

wherein $D_H$ is the hydraulic diameter of the conduit, $g_c$ is a conversion factor equal to 32.17 lb. ft./lb.$_f$s$^2$, A is the cross-sectional area of the conduit and f is Fanning's friction factor;

$$F_p = D^2 \left[ \frac{g_c \rho_g \Delta P_{tpv}}{W^2} \right]^{\frac{1}{2}}$$

wherein D is the inside conduit diameter; and $x = W_g/(W_g + W_f)$.

* * * * *